M. J. KLEIN.
SIDE FORCE AND DANGER INDICATOR.
APPLICATION FILED DEC. 28, 1914. RENEWED MAR. 3, 1920.
1,368,941.
Patented Feb. 15, 1921.
2 SHEETS—SHEET 1.
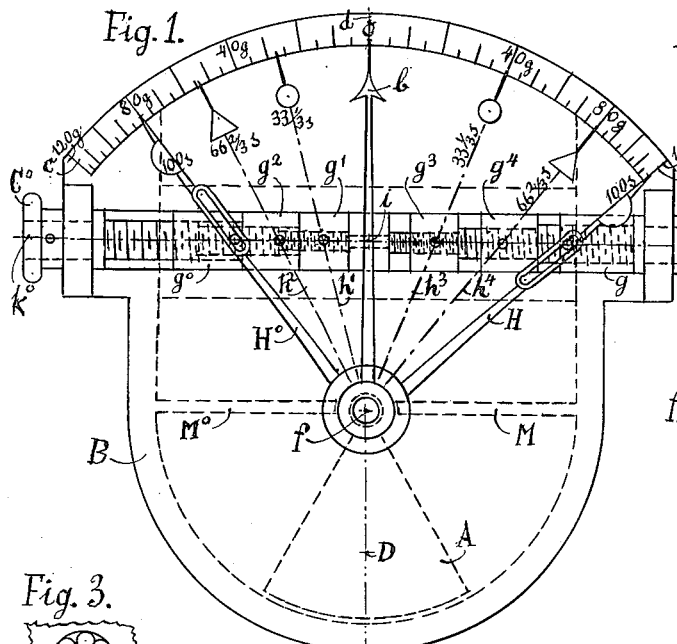
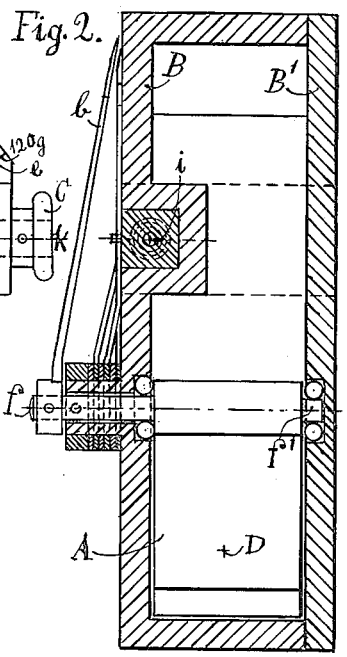
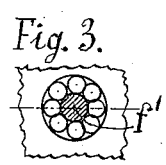
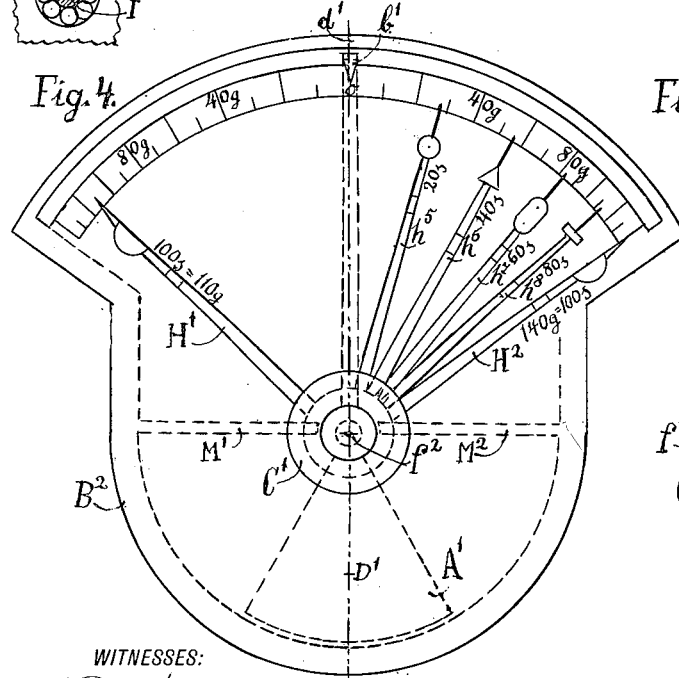
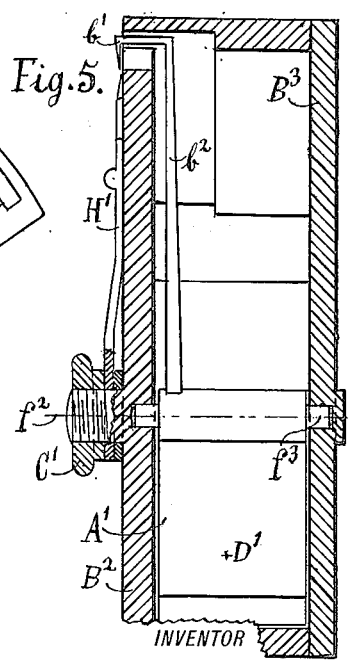
WITNESSES:
INVENTOR
Mathias J. Klein
BY Carl P. Goepel
ATTORNEY

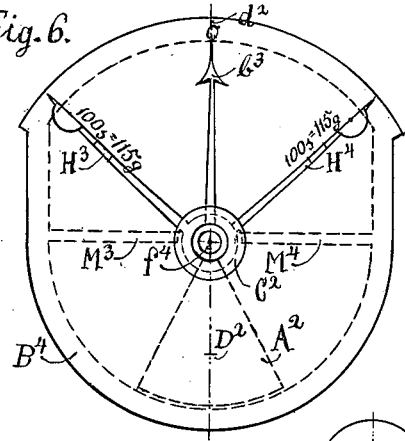
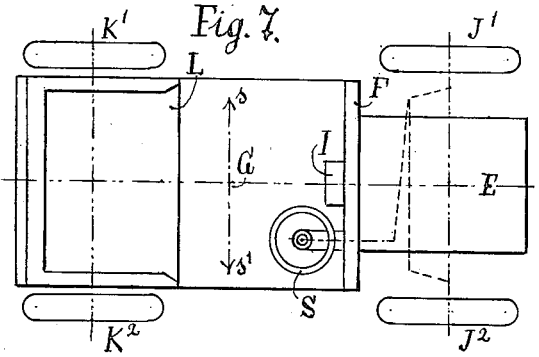
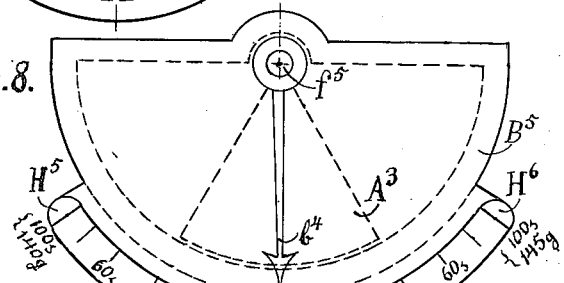
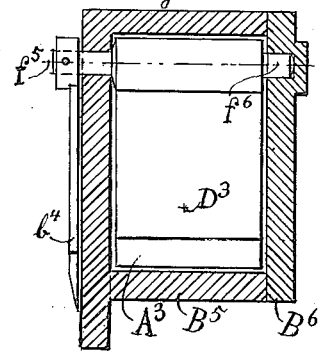
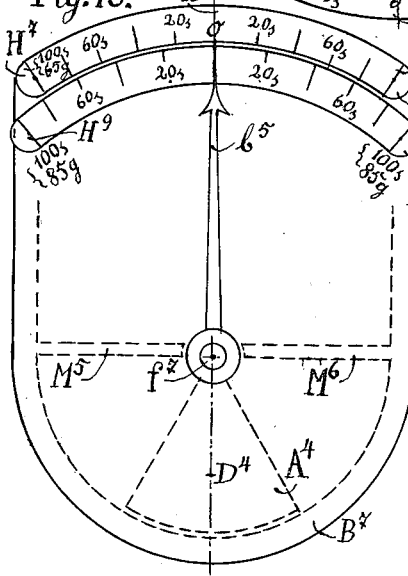
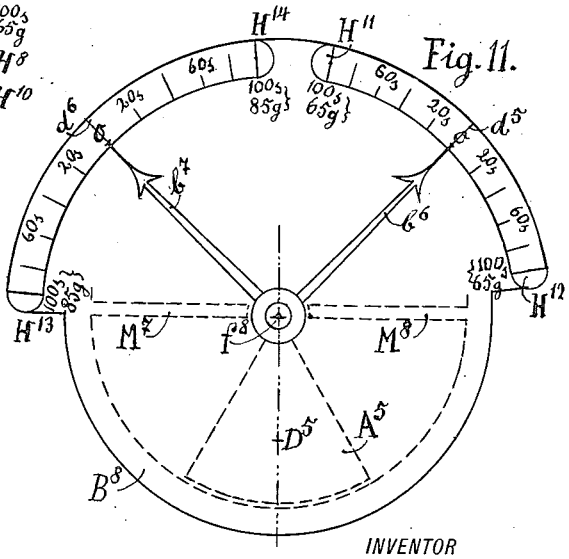

UNITED STATES PATENT OFFICE.

MATHIAS J. KLEIN, OF NEW YORK, N. Y.

SIDE-FORCE AND DANGER INDICATOR.

1,368,941.   Specification of Letters Patent.   Patented Feb. 15, 1921.

Application filed December 28, 1914, Serial No. 879,415. Renewed March 3, 1920. Serial No. 363,098.

*To all whom it may concern:*

Be it known that I, MATHIAS J. KLEIN, a citizen of the United States, residing in New York, borough of Manhattan, in the county and State of New York, have invented certain new and useful Improvements in Side-Force and Danger Indicators, of which the following is a specification.

This invention relates to indicators to be used on motor vehicles (automobiles) and other vehicles, having three or more road wheels; its object being to show, in the first place, the danger to the vehicle of being turned over, when the latter is moving in a curve at a more or less high speed, and, secondly, to show the so-called "side-force" acting sidewise on the vehicle, to the right or to the left.

This application is in part a continuation of my former application "Side-force and danger indicators," Ser. No. 571,368, filed July 11, 1910, renewed Dec. 5, 1916, Ser. No. 135,274, allowed Dec. 14, 1916, but some other improvements are added.

The invention consists of a pendulum (oscillating in a casing), put in a certain position usually on the dashboard of a motor vehicle in front of the vehicle driver; an index-hand connected directly to the pendulum or pendulum axis, is moving over a dial; the latter is always provided with two so-called "danger-marks" or "danger-hands" (which have fixed or variable positions on said dial), one danger-mark (or hand) is acting for right hand turns, and the other for left hand turns of the vehicle (the indicator is therefore double acting) and usually with one or more pairs of scales on the latter, said index-hand shows the side-force acting on the vehicle, and when either of said danger-marks or danger-hands is reached by the index-hand, the vehicle is turned over by said side-force to the right or to the left hand side. If, therefore, (vehicle moving in any curve on a level or banked road), the index-hand comes more or less near to one of said danger-marks (or danger-hands), the vehicle is more or less in danger of being turned over. The danger-marks (or hands) change their positions on the dial usually with the load of the vehicle. The scales on the dial may be non-variable (constant) scales, or variable so-called "side-force scales"; the latter show the side-force directly, the former indirectly; no scales on the dial would only show the turn over danger of the vehicle.

The definition of "center line," of "side normal," of "side-force angle," of "turn over angle," of "turn over side-force," of "tangent of side-force angle," of "tangent of turn over angle" and "its value," is the same as in my former application side force and danger indicators, Ser. No. 834,114, filed April 24, 1914. The side-force (acting always on the center of gravity of the loaded or unloaded vehicle, in the direction of said side-normal), is shown by the index-hand of the indicator on the scales of its dial in percentage of the turn over side-force, in a direct way, when variable side-force scales are used, and in an indirect way, when non-variable (constant) scales are used on the dial of the indicator. Said side-force increases in the same proportion as the tangent of the side-force angle increases. The danger-marks (or hands) on the dial (corresponding to the turn over angle of the pendulum), represent always the 100% side-force (the turn over side-force of the vehicle), and are marked with 100s in this application, but may be marked in some other way; if the index-hand reaches the 25s mark (or hand) of a side-force scale, when the vehicle is turning in a curve, a side-force of 25s or 25% (that is 25/100 or 1/4 of the turn over side-force) is shown. 100 times the tangent of the turn over angle would give the position of the corresponding danger-mark (or hand) on a non-variable grade scale; this gives the fixed relation between the positions of the danger-marks on the dial and the position of the center of gravity of the vehicle. If the vehicle stands on a level road, the index-hand of the indicator must point to zero (showing a side-force of 0%). The line from said zero-point to the oscillation axis of the pendulum, is the so-called "zero-line" of the dial. All the different forms of the indicator described in the following are double acting indicators, because they show the side-force and turn over danger for right and left hand turns of the vehicle; the scales on the dial are therefore double scales (or one or more pairs of scales). Instead of the general arrangement, having a variable pair of side-force scales on the dial, there may be used some modifications of the latter of simpler construction and simpler handling, if only a small number (one, two, three, etc.) of different loads are used or carried on the vehicle, as will be shown and described in the following.

The said indicator must be mounted on the four wheeled vehicle (the latter standing on a level road) in such a way, that the oscillation or swinging axis of the pendulum is parallel and near to the center line of the vehicle, and its index-hand points to the zero-point, otherwise its place on the vehicle is optional.

On a four wheeled vehicle, the indicator gives always correct indications, but on a three wheeled vehicle, the indications of said double acting indicators are only nearly correct.

In the accompanying drawing, Figure 1 is a front view, and Fig. 2 is vertical section through the middle line D$fd$ of the general construction of a double acting side-force and danger indicator with a variable pair of side-force scales on the dial. Fig. 3 shows a section of the ball bearings for the pendulum axis. Fig. 4 shows partly two modifications of the general arrangement (shown in Figs. 1, 2 and 3); on the right of the middle line D$^1f^2d^1$ is shown half of the front view of the first modification, having a variable side-force scale of simpler construction, and on the left of the middle line D$^1f^2d^1$ is shown half of the front view of the second modification having a non-variable grade scale on its dial. The inside construction of both modifications is the same and is shown in Fig. 5, which is a vertical section through the middle line D$^1f^2d^1$ of Fig. 4. Fig. 6 is a front view of a double acting indicator with no scales on the dial. Fig. 7 shows a plan view of a four wheeled motor vehicle, having on its dashboard one of the described indicators. Fig. 8 is a front view, and Fig. 9 a vertical section (through the middle line $d^3f^5$ of Fig. 8) of a double acting indicator with one pair of side-force scales on the dial. Fig. 10 is a front view of an indicator with two pairs of side-force scales on the dial. Fig. 11 is a front view of an indicator with two index-hands and two pairs of side-force scales on the dial. (All other indicators shown have only one index-hand on the dial.)

The Figs. 1, 2 and 3 (with a pair of variable side-force scales), show the complete and best construction of the indicator; all other indicators shown are only more or less simplified modifications of the arrangement shown in the Figs. 1, 2 and 3.

Similar letters of reference indicate corresponding parts in all figures.

The pendulum A of the double acting indicator shown in Figs. 1 and 2, oscillates around the axis $f$ $f^1$, the latter having ball bearings in the casing B B$^1$; Fig. 3 is a vertical section of said ball bearings. The index-hand $b$ is connected directly to the pendulum axis; D is the center of gravity of pendulum A and index-hand $b$; the anble D$fb$ (Fig. 1) is 180°. The dial $c$ $d$ $e$ with the vertical zero-line $fod$ is provided with two pairs of scales, with the non-variable pair of grade scales $c$ $d$ and $d$ $e$, and a variable pair of side-force scales, consisting of the scale-hands $h^1$, $h^2$, H°, and $h^3$, $h^4$, H (shown in different shapes), all turning around the pendulum axis at $f$; both pairs of scales have the same zero-line $fod$. Said grade scales extend from $d$ (the zero-point), to $c$ and $e$ (to 120g on both sides of the zero-line); the angle $dfc$ is equal to angle $efd$; its tangent is 120, and the angle $d,f,100g$ is 45°. H° and H are the two adjustable danger hands of the dial; H° acting for left hand turns and H for right hand turns of the vehicle. In line $k°k$ normal to zero-line $fd$, are the two hand screw shafts $k°$ $i$ and $k$ $i$, each with three screws of different pitch; they move (when turned) the six screw nuts $g^1$, $g^2$, $g°$, and $g^3$, $g^4$, $g$, in two slots of the casing; each of said nuts has a pin on its upper side, moving in a radial slot of one of said scale-hands (the slots of H° and H are only shown); the screw-pitch of $g^1$ is 1/2 of the pitch of $g^2$ and 1/3 of the pitch of $g°$, and the pitch of $g^3$ is 1/2 of pitch of $g^4$ and 1/3 of the pitch of $g$; and thereby the six scale-hands $h^1$, $h^2$, H°, $h^3$, $h^4$, H, are automatically moved to their proper places on the dial, when the hand buttons C° and C are turned by hand until the danger-hands H° and H reach their correct places on said pair of grade scales according to the load of the vehicle; and so the scale-hands $h^1$ and $h^3$ show always a side force of 33-1/3s, and $h^2$ and $h^4$ of 66-2/3s, and of course, H° and H of 100s, when said index-hand $b$ reaches them. The danger-hand H points to 120g, and H° to 80g of said grade-scales; therefore, the scale-hand $h^3$ must point to 40g (1/3 of 120g), and $h^4$ to 80g (2/3 of 120g); on the left hand side of zero-line $fd$, the case is similar for the scale-hands $h^1$ and $h^2$. If each of said variable side-force scales had five scale-hands (20s, 40s, 60s, 80s, 100s), instead of three, each of said hand screw-shafts $k°$ $i$ and $k$ $i$ would have five screws with screw-pitches varying in the proportion: 1:2:3:4:5; and similar for any other number of scale-hands.

Figs. 4 and 5 show partly two modifications of the general arrangement shown in Figs. 1, 2 and 3 (without ball bearings). In both modifications the pendulum A$^1$ oscillates around the axis $f^2$ $f^3$ inside of the casing B$^2$ B$^3$; the index-hand $b^1$ $b^2$ (partly inside of the casing) is connected directly to the pendulum body (or axis) as shown; the center of gravity of pendulum $A^1$ and index-hand $b^1$ $b^2$ is at $D^1$. On each side of the vertical zero-line $f^2d^1$ of the dial, is a non-variable grade-scale (as used on gradometers); $H^1$ and $H^2$ are the two adjustable danger-hands turning around $f^2$. On the right hand side of the zero-line (for right-hand vehicle turns) is shown a variable side-force scale consisting of the five scale-hands $h^5$, $h^6$, $h^7$, $h^8$ and $H^2$ (all turning around $f^2$), and showing always the side-forces 20s, 40s, 60s, 80s and 100s respectively, when reached by index-hand $b^1$ $b^2$; the scale-hand $h^5$ (20s) points always to a grade scale point which is 1/5 (20/100), $h^6$ (40s) points always to a grade scale point which is 2/5 (and so on), of the grade scale point to which the danger-hand $H^2$ points. As the indicator is double acting, on the left of zero-line $f^2d^1$ is the same arrangement (not shown) for left hand vehicle turns; by loosening and tightening of the hand-screw $C^1$ all ten scale-hands of the variable pair of side-force scales are set by hand to their proper places as before described. Instead of five, any other number of scale hands may be used for each scale; this is one of the modifications; here the two hand screw-shafts $k^0$ $i$ and $k$ $i$ of Fig. 1 are not needed; the indicator is therefore simpler in construction, but it takes much more time in changing said variable pair of side-force scales for another load of the vehicle than it takes in the Fig. 1 case.

The other modification of the arrangement shown in Figs. 1 and 2, as shown in part on the left of zero-line $f^2d^1$, Fig. 4, is still simpler in construction; the dial is provided only with a non-variable pair of grade-scales and two adjustable danger hands, one on each side of $f^2d^1$; said danger hands are set by hand (by loosening and tightening of hand screw $C^1$ according to vehicle load; here, the side-force can not be read off directly, but indirectly on said non-variable pair of grade scales. If, for instance, danger-hand $H^1$ for left hand vehicle turns points to 110g of one of said grade scales (the tangent of the corresponding turn over angle being 1.10), and index-hand $b^1$ $b^2$ reaches 55g (on the grade scale), a side-force of (100×55/110) 50s or 50% (1/2 of the turn over side force) is shown; if said index-hand reaches 88g, a side-force of (100×88/110) 80s or 80% is shown on the dial in an indirect way. In this second modification of the Figs. 1, 2, 3 arrangement, the ball bearings and the two hand screw shafts $k^0$ $i$ and $k$ $i$ are left away, and also all the scale hands (except the 100s or danger hands) are left away; and if also the non-variable pair of grade-scales is left away in said second modification a third modification of the Figs. 1, 2, 3, arrangement appears, as shown in Fig. 6; (its vertical section is about the same as the one shown in Fig. 5). The pendulum $A^2$ oscillates in casing $B^4$ around $f^4$; the index-hand $b^3$ is connected directly to the pendulum body (or axis) in the same way as shown in Fig. 1 or 5; $D^2$ is the center of gravity of pendulum $A^2$ and index-hand $b^3$; $f^4d^2$ is the vertical zero-line on the dial, and $H^3$, $H^4$ (turning around $f^4$) are the two adjustably danger-hands which can be set by hand (by loosening and tighten of hand screw $C^2$) according to the load of the vehicle; as the dial has no pair of side-force scales, the side-force can not be read off, it can only be roughly estimated, as the index-hand $b^3$ comes more or less near to one of said danger-hands $H^3$, $H^4$.

Fig. 7 is a plan view of a four wheeled motor vehicle having connected to its dashboard F the double acting side-force and danger indicator I; $J^1$ and $J^2$ are the front steering wheels, $K^1$ and $K^2$ the rear driving wheels, L is the seat for the vehicle driver, S the hand steering wheel, and G the center of gravity of the vehicle; EG parallel to the side road wheels is the center line, and the straight line $sGs^1$ normal to EG is the side-normal. For right hand vehicle turns, the side-force acts on G in the direction G$s$, and for left hand turns in the direction of G$s^1$.

If the vehicle carries always the same load, the danger-hands of the indicator would always have fixed positions on the dial shown in Figs. 1, 2, 3, therefore, a modification of the latter arrangement (of much simpler construction), as shown in the Figs. 8 and 9, could be used; Fig. 8 is a front view and Fig. 9 a vertical section of the indicator. The pair of side-force scales $H^5$ $H^6$ (with danger-marks $H^5$ and $H^6$) has a fixed position on the dial; the index-hand $b^4$, connected directly to the axis $f^5$ $f^6$ of pendulum $A^3$, shows the side-force acting on the vehicle directly on said pair of side-force scales, when the vehicle is moving in a curve. $D^3$ is the center of gravity of pendulum $A^3$ and index-hand $b^4$. $A^3$ has bearings in the casing $B^5$ $B^6$. $f^5od^3$ is the zero-line of the indicator dial.

Another modification of Figs. 1, 2, 3, of simpler construction, is shown in Fig. 10 in a front view, having two pairs of side-force scales on its dial, for a motor vehicle carrying as a rule only two different loads (loaded and unloaded); $H^7$ and $H^8$ are the acting danger-marks when the vehicle is loaded, and $H^9$ and $H^{10}$ are the acting danger-marks, when the vehicle is unloaded; therefore, only two danger-marks are on the dial at a certain time, and not more. The index-hand $b^5$ is connected to the axis $f^7$ or pendulum $A^4$; $D^4$ being the center of gravity of $A^4$ and $b^5$, and $f^7od^4$ the zero-line of the dial on the casing $B^7$ of the indicator. When the vehicle is moving in a curve, the index-hand $b^5$ shows on the upper pair of side-force scales, the side-force acting on the center of gravity of the loaded vehicle, and on the lower pair of side-force scales, the side-force acting on the center of gravity of the unloaded vehicle. For the loaded vehicle, the lower pair of side-force scales may be taken away from the dial, and for the unloaded vehicle, the upper side-force scale-pair may be taken away, without interfering with the indications of the indicator. This arrangement (Fig. 10) is also simpler in operation (or handling), because the movement of the danger-marks by hand (in the Figs. 1, 2, 3 case) for another load is here (Fig. 10) not needed.

If more than two, a plurality of different loads are used on the vehicle, a plurality of side-force scales may be used on the dial of the indicator; the 100s marks of any of said pairs of scales are the two acting danger-marks, when the corresponding load is used or carried on the vehicle, therefore, only two danger-marks (one for a right hand turn, and the other for a left hand turn of the vehicle) are acting or working on the dial at a certain time.

Fig. 11 is a front view of a double acting indicator having two index-hands $b^6$, $b^7$, and two pairs of side-force scales (with the two zero-lines $f^8 d^5$ and $f^8 d^6$) on its dial. The danger-marks $H^{11}$, $H^{12}$, and index-hand $b^6$ are acting for the loaded, and $H^{13}$, $H^{14}$ and $b^7$ for the unloaded vehicle. $A^5$ is the pendulum oscillating around its axis $f^8$ in casing $B^8$; the two index-hands $b^6$ and $b^7$ are directly connected to pendulum axis $f^8$; $D^5$ is the center of gravity of pendulum $A^5$ and the two index-hands $b^6$ and $b^7$. Fig. 11 is only a modification of the Fig. 10 arrangement.

The partitions $M^0$ and M in the casing of Fig. 1, and the partitions $M^1$, $M^2$ in Fig. 4, $M^3$ $M^4$ in Fig. 6, $M^5$ $M^6$ in Fig. 10, and $M^7$ $M^8$ in Fig. 11, have the same object as the partitions M and $M^1$ in the casing L of the Fig. 4 arrangement of my former application above mentioned, that is, to stop the oscillations of the pendulums quickly.

The indicators shown in the Figs. 4 to 11, are without ball bearings for the pendulum axis; said indicators may have also ball bearings as shown in Figs. 1, 2, 3, or of a similar construction.

Having thus described my invention, I claim as new and desire to secure by Letters Patent:—

1. In combination with a vehicle, a double acting side force and danger indicator, a casing, a pendulum in said casing, a dial on said casing having two danger-marks and a pair of side-force scales (one on each side of the zero-line), the positions of said danger-marks on said dial being determined by the position of the center of gravity of the loaded vehicle, and an index-hand connected directly to the pendulum body, and moving over said pair of scales, the oscillation-axis of the pendulum being parallel with and near to the center-line of the vehicle, said index-hand showing thereby on said side-force scales when the vehicle is moving in a curve on a level or banked road, the side-force acting on the vehicle, and the increased danger of the latter being turned over, when said index-hand comes more or less close to one of said two danger-marks.

2. In combination with a vehicle, a double acting side force and danger indicator, a casing, a pendulum in said casing, a dial on said casing having a plurality of pairs of side-force scales, corresponding to a plurality of different vehicle loads, two 100s marks on each pair of said scales, said two 100s marks of each pair of scales being the two acting danger-marks of the dial, when said pair of side-force scales act for a certain vehicle load; the position of the two acting danger-marks on the dial being determined by the position of the center of gravity of the corresponding load of the vehicle, and an index-hand connected directly to the pendulum body, and moving over said scales, the oscillation-axis of the pendulum being parallel with and near to the center-line of the vehicle, said index-hand showing thereby on said acting pair of side-force scales, when the vehicle is movng in a curve on a level or banked road, the side-force acting on the vehicle, and the increased danger of the latter being turned over, when said index-hand comes more or less close to one of said two acting danger-marks.

3. In combination with a vehicle, a double acting side force and danger indicator, a casing, a pendulum in said casing, a dial on said casing having two adjustable danger-hands (one on each side of the zero-line) and two pairs of scales, one being a non-variable pair of grade scales and the other a variable pair of side-force scales, each scale of the latter consisting of a certain number of scale-hands turning around the axis of the pendulum, each scale-hand being set by hand with reference to said non-variable pair of grade scales, said danger-hands adapted to be set according to the position of the center of gravity of the loaded vehicle, and an index-hand connected directly to the pendulum body, and moving over said variable pair of side-force scales, the oscillation-axis of the pendulum being parallel with and near to the center-line of the vehicle, said index-hand showing thereby on said side-force scales when the vehicle is moving in a curve on a level or banked road, the side-force acting on the vehicle, and the increased danger of the latter being turned over, when said index-hand comes more or less close to one of said two danger-hands.

4. In combination with a vehicle, a double acting side force and danger indicator, a casing, a pendulum in said casing, a dial on said casing with an index-hand (connected directly to the pendulum body) moving over said dial, the latter having two adjustable danger-hands (one on each side of the zero-line) and two pairs of scales, one being a non-variable pair of grade scales and the other a variable pair of side-force scales, each scale of the latter consisting of a certain number of scale-hands turning around the axis of the pendulum, each of said scale-hands having a radial slot in which a pin moves, said pins being connected to the screw-nuts of two hand-screw shafts (the axes of the latter being normal to the zero-line of the indicator), said hand-screw shafts have so many screws of different pitches as there are screw-nuts or pins, the distance of each pin from said zero-line being (by means of said two hand-screw shafts) kept in proportion to the side-force which the corresponding scale-hand indicates, said scale-hands being set by means of said two hand-screw shafts, one of the latter moving one half of all the scale-hands (as indicated by said non-variable pair of grade scales) to their proper places according to the load of the vehicle for right hand vehicle turns, and the other hand-screw moving the rest of the scale-hands in the same way for left hand vehicle turns, so that each of said scale-hands shows always the same side-force when said index-hand reaches it, the adjusted position of said danger-hands on said dial being determined by the position of the center of gravity of the loaded vehicle, the oscillation axis of the pendulum being parallel with and near to the center-line of the vehicle, said index-hand showing thereby on said side-force scales when the vehicle is moving in a curve on a level or banked road, the side-force acting on the vehicle, and the increased danger of the latter being turned over, when said index-hand comes more or less close to one of said two danger-hands.

In testimony, that I claim the foregoing as my invention, I have signed my name in presence of two subscribing witnesses.

MATHIAS J. KLEIN.

Witnesses:
F. HOGG,
JOS. BISBAND.